Figure 1:
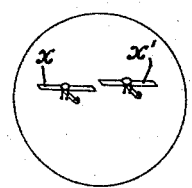

April 26, 1938.  J. W. FRENCH  2,115,626
RANGEFINDER AND LIKE OPTICAL MEASURING INSTRUMENT
Filed April 27, 1937

INVENTOR
James Weir French
BY
E. H. Bond
ATTORNEY

Patented Apr. 26, 1938

2,115,626

UNITED STATES PATENT OFFICE 2,115,626

RANGEFINDER AND LIKE OPTICAL MEASURING INSTRUMENT

James Weir French, Anniesland, Glasgow, Scotland, assignor to Barr and Stroud, Limited, Anniesland, Glasgow, Scotland Application April 27, 1937, Serial No. 139,317
In Great Britain July 8, 1936

12 Claims. (Cl. 88—2.7)

This invention refers to rangefinders and like optical measuring instruments, i. e. instruments which depend for their action upon measurement of parallax angle, thus, rangefinders of the stereoscopic or coincidence type using the instrument base as the base for angle measurement and measuring the angle subtended at the object observed, or inclinometers which use the observed object as the base for angle measurement and measure the angle subtended by that base at the instrument. Although capable of application generally, the invention is particularly concerned with rangefinders of the stereoscopic type.

Such instruments comprise an optical magnifying system to enable observations to be made with accuracy on distant objects. For observation, especially in the case of stereoscopic instruments, the images formed should generally be small in comparison with the area of the field of view. If, however, the magnification of the instrument is such as to give in the field of view at long ranges images which are of a suitable size, then at lower ranges the images formed with that magnification may tend to be too large to enable observation to be conveniently made. This, if, for example, observations are being made on an approaching aeroplane and at, say, 10,000 yards images of a suitable size are formed, then at a range of, say 1000 yards the image formed may be such that only a relatively small part of the aeroplane appears in the field of view.

According to this invention, provision is made whereby the action of setting the instrument in accordance with decrease or increase of range of the object under observation causes the magnification of the instrument to be simultaneously decreased or increased correspondingly so that the image produced in the field of view may be always of suitable size for observations to be made.

For this purpose, in accordance with the invention the mechanism for moving the optical measuring element (or elements) of the instrument, for example, a prism translatable along one of the beams of light, is operatively connected to a movable optical part (or parts) movement of which varies the magnification of the instrument. The connection may be such that the magnification is caused to vary directly with the range, or the variation of magnification may be in accordance with some function of the range.

Further, provision may be made whereby the magnification-changing optical part (or parts) may be operated independently of the range measuring element (or elements) as well as conjointly therewith, and (or) the range measuring element independently of the magnification-changing optical part as well as conjointly therewith.

The invention, applied to stereoscopic rangefinders, will now be described with reference to the accompanying drawing, in which:—

Figure 2:
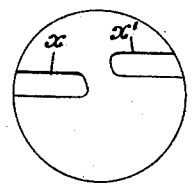
Figure 3:
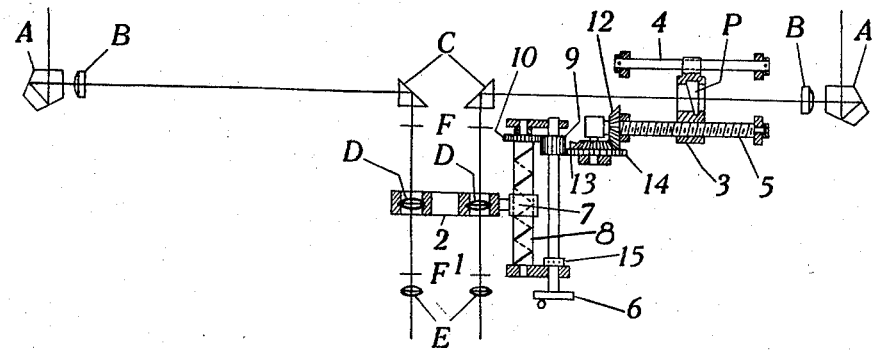
Figure 4:
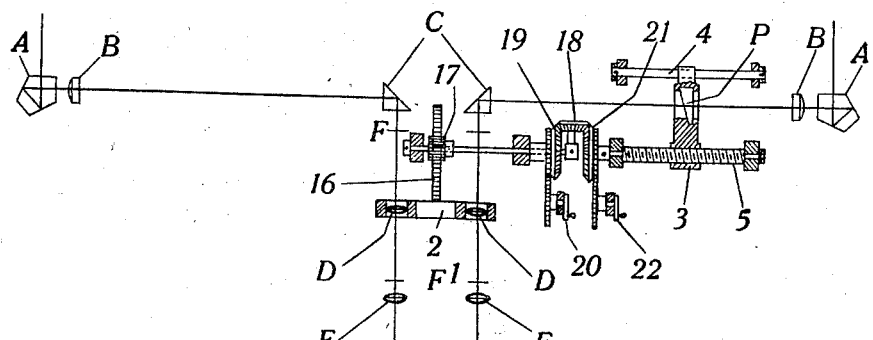

Figures 1 and 2 are explanatory diagrams, and
Figures 3 and 4 are diagrams showing two examples of construction.

Figures 1 and 2 show the field of view of a stereoscopic rangefinder. In Figure 1, two images x, $x^1$ of a distant aeroplane which are to be stereoscopically compared for range measurement are shown in the field of view, the magnifying power of the instrument being such that the images are of suitable size for comparison. If, however, the aeroplane is approaching and the magnifying power of the instrument remains the same, a condition as illustrated in Figure 2 may be reached, where only relatively small parts of the aeroplane, the wing tips, are seen, under which conditions accurate stereoscopic observation is difficult or impossible. For accurate and convenient observation the images should at all ranges remain of a size somewhat as shown in Figure 1.

Figure 3 shows a rangefinder optical system comprising pentagonal prisms A, objectives B, reflecting prisms C, projector lenses D, eye lenses E, and measuring prism P movable along the right hand beam. F and $F^1$ are the first and second focal planes, respectively, the projector lenses D forming images of F at $F^1$ which are viewed by the eye lenses E.

The projector lenses D are mounted together in a holder 2 for movement towards and away from the focal plane $F^1$, movement towards that plane diminishing the magnification and movement away from it increasing magnification. As the range decreases the measuring prism P, which is carried in a holder 3 guided by a rod 4 and mounted upon a screw 5, is moved towards the right in order to determine the range of nearer objects, and, for the purposes of the invention, the arrangement is such that when the measuring prism holder 3 is moved towards the right the projector lens holder 2 is moved correspondingly towards the focal plane $F^1$. The combined movements are effected by mechanism which comprises a rotatable head 6 operating the projector lens holder 2 through the intermediary of a nut 7, a screw 8, and pinion wheels 9 and 10, and which also translates the prism P through the intermediary of the screw 5, bevel gears 12 and 13, and a pinion wheel 14 rotatable with the bevel gear 13 and adapted to mesh with the pinion wheel 9.

In the condition shown in Figure 3 rotation of the head 6 moves the prism P and the projector lenses D together, but when the head 6 is pushed inwards the pinion wheel 9 becomes disengaged from the wheel 14 but remains in engagement with the wheel 10, whereby the projector lens holder 2 can be moved in either direction without altering the position of the measuring prism P, and when the head 6 is pulled outwards, thereby disengaging the wheel 10 but engaging the wheel 14, the measuring prism P may be moved independently of the holder 2, which may be left in any desired magnification position. A collar 15 or other device can be set to determine the three positions, namely, combined operation of magnification-changing and range measuring elements, or independent operation of either.

In the construction shown in Figure 4, mechanism for operating the projector lens holder 2 and the measuring prism P comprises a rack 16, and a pinion wheel 17 rotatable with the jockey element 18 of a differential gear, one side 19 of which can be operated from a handle 20 and the other side 21 from a handle 22, the screw 5 for translating the measuring prism P being rotatable with the side 21 of the differential gear. By means of this mechanism, the measuring prism P and projector lens holder 2 can be translated simultaneously by operation of the handle 22, while by operation of the handle 20 the holder 2 can be moved independently of the measuring prism P.

I claim:—

1. A rangefinder or like optical measuring instrument comprising two telescope systems, an optical element movable for effecting measurement of parallax angle, mechanism for moving the said optical measuring element, optical means in each of the two telescope systems movable for varying the magnification, and mechanism operatively connecting said magnification-varying means with the mechanism for moving the optical measuring element to cause the magnification to decrease or increase in accordance with decrease or increase of range.

2. A rangefinder or like optical measuring instrument comprising two telescope systems, an optical element movable for effecting measurement of parallax angle, mechanism for moving the said optical measuring element, optical means in each of the two telescope systems movable for varying the magnification, and mechanism operatively connecting said magnification-varying optical means with the mechanism for moving the optical measuring element to cause the magnification to decrease or increase in accordance with decrease or increase of range, the said connecting mechanism including a device for interrupting the connection, enabling the optical measuring element to be operated independently of the magnification-varying optical means.

3. A rangefinder or like optical measuring instrument comprising two telescope systems, an optical element movable for effecting measurement of parallax angle, mechanism for moving the said optical measuring element, optical means in each of the two telescope systems movable for varying the magnification, and mechanism operatively connecting said magnification-varying optical means with the mechanism for moving the optical measuring element, to cause the magnification to decrease or increase in accordance with decrease or increase of range, the said connecting mechanism including a device for interrupting the connection, enabling the magnification-varying optical part to be operated independently of the measuring element and the measuring element to be operated independently of the magnification-varying optical part.

4. A rangefinder or like optical measuring instrument comprising two telescope systems, a prism translatable along the beam of light of one of said systems for effecting measurement of parallax angle, mechanism for translating the said measuring prism, two projector lenses translatable for varying the magnification, one in each telescope system, and means operatively connecting said projector lenses with the mechanism for moving the measuring prism to cause the magnification to decrease or increase in accordance with decrease or increase of range.

5. A rangefinder or like optical measuring instrument comprising an optical magnifying system, an optical element movable for effecting measurement of parallax angle, mechanism including an operating head for moving the said optical measuring element, an optical part of the optical magnifying system movable for varying the magnification, and means operatively connecting said magnification-varying optical part with the mechanism for moving the optical measuring element to cause the magnification to decrease or increase in accordance with decrease or increase of range, the said connecting means including a differential gear associated with a second operating head, enabling movement of the magnification-varying optical part to be effected together with movement of the optical measuring element from the first head, and movement of the magnification-varying optical part to be effected independently of the measuring element from the second head.

6. A rangefinder or like optical measuring instrument operating on the stereoscopic principle, comprising two end reflector members to receive incoming light and direct two beams of light towards the middle of the base, an objective in each of the two beams of light, two reflecting members for directing the two beams of light at right angles to the base to the eyes of the observer, a prism movable longitudinally in one of the beams of light for effecting measurement of parallax angle, mechanism including an operating head for moving the prism, two projector lenses, one in each of the beams, a holder for the projector lenses movable along the beams for varying the magnification, and mechanism connecting the said holder with the prism moving mechanism to cause the magnification to decrease or increase in accordance with decrease or increase of range.

7. A rangefinder or like optical measuring instrument operating on the stereoscopic principle, comprising two end reflector members to receive incoming light and direct two beams of light towards the middle of the base, an objective in each of the two beams of light, two reflecting members for directing the two beams of light at right angles to the base to the eyes of the observer, a prism movable longitudinally in one of the beams of light for effecting measurement of parallax angle, mechanism including an operating head for moving the prism, two projector lenses, one in each of the beams, a holder for the projector lenses movable along the beams of light for varying the magnification, and mechanism connecting the said holder with the prism moving mechanism to cause the magnification to decrease or increase in accordance with decrease or increase of range, the connecting mechanism including a clutch device enabling the measuring prism and the projector lens holder to be operated each independently of the other as well as together.

8. A rangefinder or like optical measuring instrument operating on the stereoscopic principle, comprising two end reflector members to receive incoming light and direct two beams of light towards the middle of the base, an objective in each of the two beams of light, two reflecting members for directing the two beams of light at right angles to the base to the eyes of the observer, a prism movable longitudinally in one of the beams of light for effecting measurement of parallax angle, mechanism including an operating head for moving the prism, two projector lenses, one in each of the beams, a holder for the projector lenses movable along the beams of light for varying the magnification, and mechanism connecting the said holder with the prism moving mechanism to cause the magnification to decrease or increase in accordance with decrease or increase of range, the connecting mechanism including a differential gear enabling the projector lens holder to be operated independently of the measuring prism as well as with it.

9. A rangefinder or like optical measuring instrument comprising two telescope systems, an optical element movable for effecting measurement of parallax angle, mechanism for moving said optical measuring element, two optical parts, one in each of the two telescope systems, movable for varying the magnification, and mechanism operatively connecting the said magnification-varying parts with the mechanism for moving the optical measuring element to cause the magnification to decrease or increase in accordance with decrease or increase of range.

10. A rangefinder or like optical measuring instrument comprising two telescope systems, an optical element movable for effecting measurement of parallax angle, optical means in each of the two telescope systems movable for varying the magnification, an operating head, operating mechanism connecting said optical measuring element with said operating head, operating mechanism connecting said magnification-varying optical means with the operating head, so that movement of the operating head causes the magnification to decrease or increase in accordance with decrease or increase of range, and a clutch device for disconnecting the operating head from the optical measuring element or from the magnification-varying optical means, so that either can be operated independently of the other.

11. A rangefinder or like optical measuring instrument comprising an optical magnifying system, light deflecting means movable in the light path to cause variable optical deflection and image movement, for effecting measurement of parallax angle, mechanism for moving the said light deflecting means, an optical part of the optical magnifying system movable for varying the magnification, and means operatively connecting said magnification-varying optical part with the mechanism for moving the light deflecting means to cause magnification to decrease or increase in accordance with decrease or increase of range.

12. A rangefinder or like optical measuring instrument comprising an optical magnifying system, a deviating prism arrangement movable in the light path to produce variable optical deflection and image movement, for effecting measurement of parallax angle, mechanism for moving the said deviating prism arrangement, an optical part of the optical magnifying system movable for varying the magnification, and means operatively connecting said magnification-varying optical part with the mechanism for moving the deviating prism arrangement to cause the magnification to decrease or increase in accordance with decrease or increase of range and simultaneously therewith.

JAMES WEIR FRENCH.